UNITED STATES PATENT OFFICE.

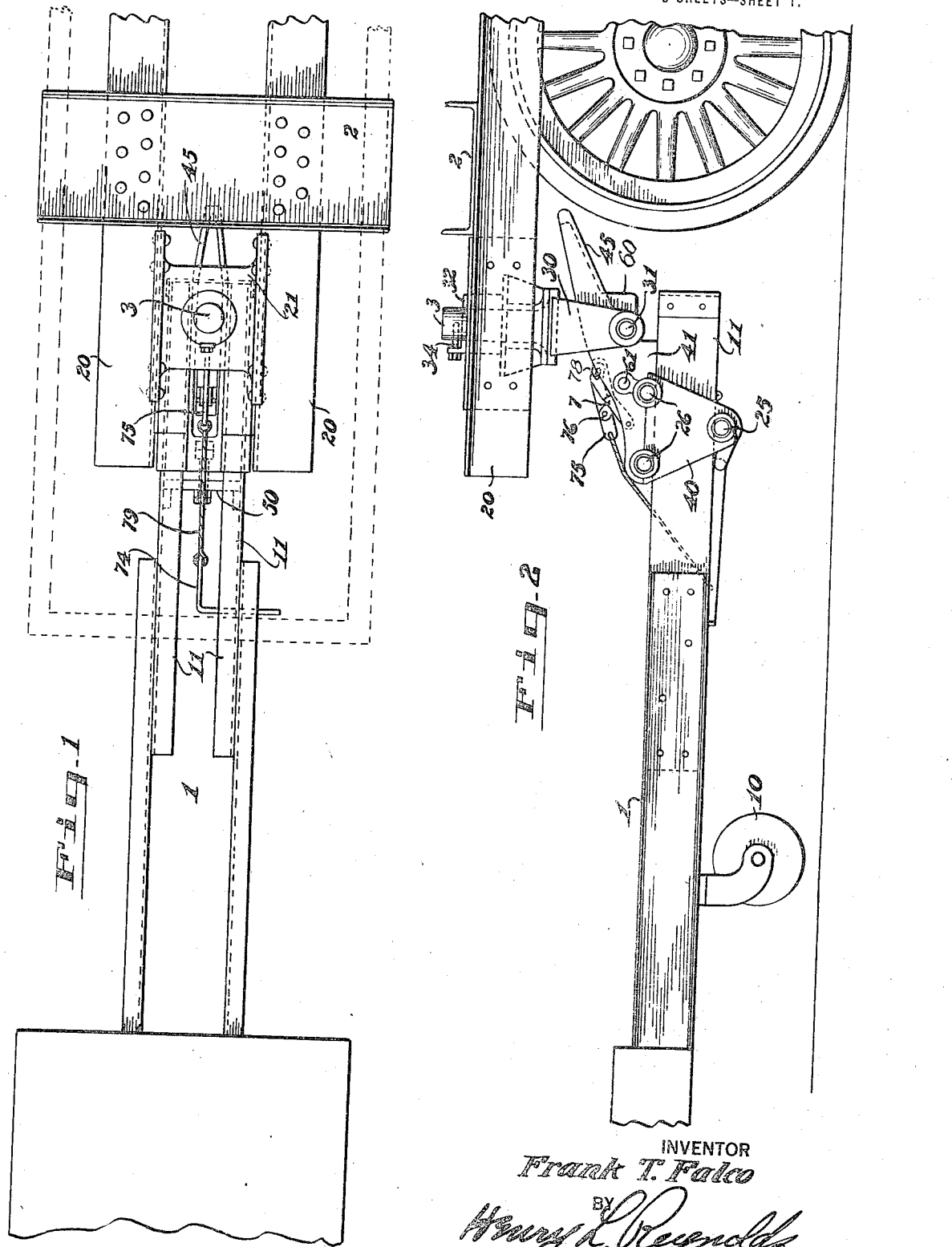

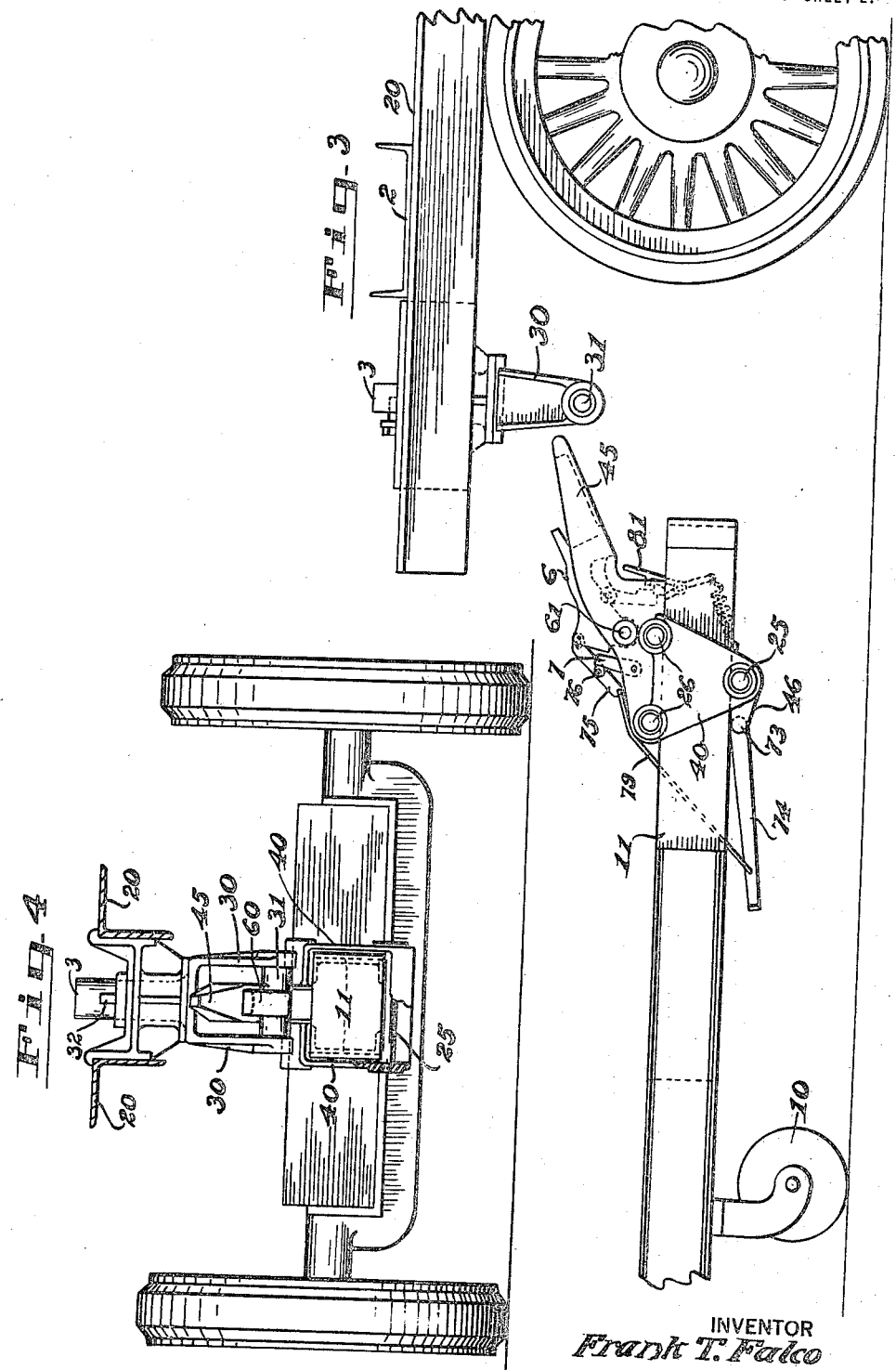

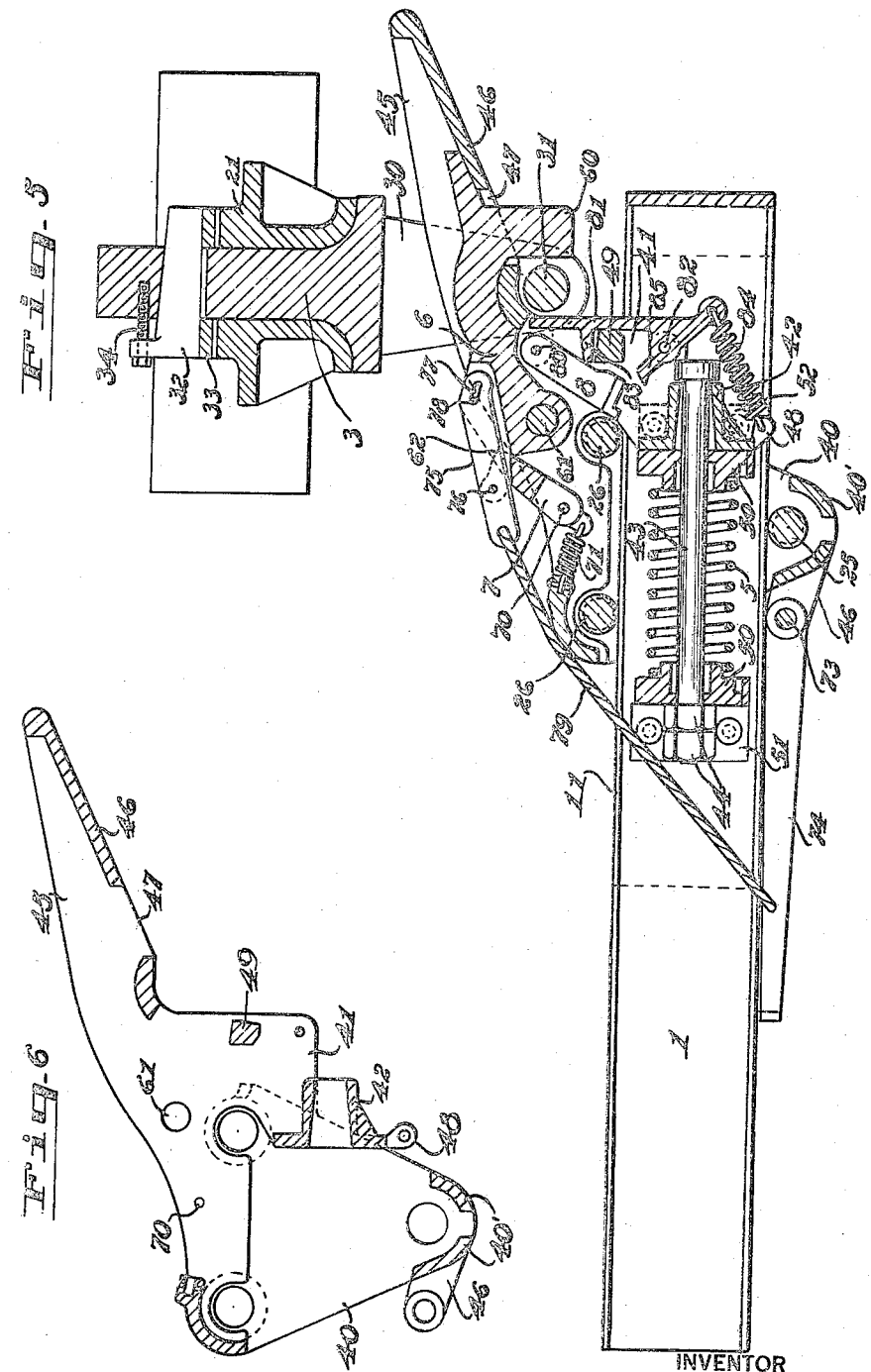

FRANK T. FALCO, OF SEATTLE, WASHINGTON, ASSIGNOR TO PACIFIC CAR & FOUNDRY CO., OF SEATTLE, WASHINGTON, A CORPORATION OF WASHINGTON.

DEVICE FOR COUPLING TRAILERS TO TRACTORS.

1,342,949.      Specification of Letters Patent.      Patented June 8, 1920.

Application filed November 26, 1919. Serial No. 340,879.

*To all whom it may concern:*

Be it known that I, FRANK T. FALCO, a citizen of the United States, and resident of the city of Seattle, county of King, and State of Washington, have invented certain new and useful Improvements in Device for Coupling Trailers to Tractors, of which the following is a specification.

My invention relates to coupling devices for use between tractors and trailers. The object of my invention is to provide a coupling device between tractor and trailer which is automatic in the sense that it may be coupled by relative movement between the tractor and trailer.

A further object is to provide a coupling means which, in the act of coupling by relative movement between tractor and trailer, will slightly raise the forward end of the trailer.

A further object is to provide a practical and simple means for employing a draft spring between the tractor and trailer, and also means whereby such resilient draft member may be incorporated in, or with, the reach of the trailer.

Other objects of my invention may be determined by an inspection of the drawings and a study of the specification describing the same. The features of my invention which I deem to be new and upon which I desire to secure Letters Patent, will be hereinafter described and then pointed out in the claims.

In the accompanying drawings I have shown the construction of my device as I now build the same.

Figure 1 is a top plan view of my device, showing its position relative to the chassis of the truck and of the trailer.

Fig. 2 is a side elevation of the device showing the coupling as made.

Fig. 3 is a side elevation of the device, showing the parts in position for coupling.

Fig. 4 is an end view, looking rearwardly, showing the parts of the coupling carried both by the tractor and the trailer with the supporting bars 20 in section.

Fig. 5 is a longitudinal section through the coupling devices, showing them as connected together.

Fig. 6 is a similar section taken through the draft block alone.

The particular type of coupling herein set forth has been especially designed for use in connection with two-wheeled trailers, which are provided with forwardly extending reaches or tongues, which are secured to the tractor, whereby a portion of the weight carried by the trailer is communicated to the tractor. The general type of trailer is represented in my former application for a trailer, Serial No. 286516, filed March 31, 1919.

In the drawings, 1 represents the forwardly extending reach of such a trailer. This is provided with a caster wheel, as 10, which is intended to support the reach when it is disconnected from the trailer. This would preferably be made vertically adjustable, after the manner illustrated in the said application, or in any other suitable and desired manner.

That part of the draft connection and coupling carried by the tractor, includes a king pin which projects beneath the chassis, and on its lower end carries a yoke, in which is mounted a horizontally positioned draft pin. As herein shown, this device is supported from a plate 2, which extends transversely of the chassis and is fixedly secured thereto, through the medium of longitudinally extending bars 20, one at each side of the center line of the tractor between which bars is secured the block 21 in which the king pin is journaled.

The block 21, in which the king pin is journaled, may be of any suitable construction which forms a suitable bearing and support for the king pin. This block is secured to the plates 20, or any other equivalent member carried by the chassis. The lower end of the king pin is provided with, or has secured thereto, a yoke, as 30, which has two separated arms. Between these arms, at their lower ends, extends a horizontally positioned draft pin 31. This provides for universal movement between the trailer reach and the tractor.

The king pin, in the construction shown, is supported by means of a key 32 which passes through a slot in the upwardly projecting end of the king pin and between which and the block 21 is a wear plate, or washer, 33. This key is held against removal by means of a bolt, as 34, which passes through an ear upon the key and screws into the body of the king pin.

The draft block which is provided with the complemental portions of the coupling, is mounted to have a limited fore-and-aft movement upon the reach.

The construction of reach which is preferred and herein shown, consists of two channel bars 11, which are spaced apart a sufficient distance to accommodate certain portions of the coupling mechanism. The draft block 4 is shown separate from the other parts and in section in Fig. 6. It is provided with two wing plates 40 which are so spaced that they may pass downward at opposite sides of the reach. The lower ends of these wing plates extend below the lower surface of the reach and are connected by the bars 40′. These wing plates also have journaled therein rollers which engage the top and bottom surfaces of the reach. I have herein shown a single roller 25 engaging the lower surface of the reach, and two rollers, 26, engaging the upper surface. The number of rollers and their position may be varied as desired.

Toward the forward end of the draft plate is an arm, consisting of two separated webs, 41, which extends downward into the space between the two side bars 11 of the reach. This bar is designed to be connected with the spring 5 which forms a resilient connection between the draft block and the reach. At each end of the spring 5 are the compression plates 50. One of these compression plates, that one which is forwardly, engages directly with the vertical surface which is at the rear side of the boss 42, through which boss extends the bolt 43, the head of which engages the forward end of the boss 42. The boss 42 is integral with the webs 41.

At the rear end of this bolt are nuts 44, which engage with the rear surface of the other compression block 50. The compression blocks are limited in their movement outwardly, or away from each other and the springs, by means of blocks, herein shown as block 51, which are secured to the bars 11 forming a part of the reach.

This type of spring draft rigging resembles in principle the draft rigging commonly used in connection with the draft bars of cars and is not supposed to be new, excepting in the particular combinations herein employed and which are claimed.

The draft block has a finger or nose, 45, which extends forwardly and at an upward incline. This is preferably beveled or tapered in a transverse direction, as is clearly shown in Fig. 1. The object of this is to assist in centering the parts of the coupling when the coupling is being made. The yoke 30 is made of ample width to receive this finger and will properly register with the finger when the tractor is backed up to the trailer, even if it be laterally somewhat displaced from exact central alinement.

The finger 45 is preferably made of a U-shaped cross section consisting of side flanges and a bottom connecting web, as 46. This bottom web is provided with a hole, as 47, adapted to permit the passage of the bill 60 of a draft hook 6. This draft hook is pivoted, as at 61, to the draft block. The body thereof extends forwardly and lies between the side flanges of finger 45. Its tip has a downwardly projecting bill 60, which passes through the hole 47 and engages with the draft pin 31. When this is done, and the parts are in the position shown in Fig. 5, the trailer is connected with the tractor in such manner that it is impossible for them to become disengaged without breaking some part.

To insure the draft hook against being thrown upward while the parts are coupled together, I provide a locking dog. This dog 7 is pivoted at 70 to the draft block. Its upper end is adapted to drop into position to engage a slight recess or ledge at 62 on the draft hook. It is normally retained in this locked position by means of a spring 71, which connects its lower end with a part of the draft block. While this dog is thus engaged, it is impossible for the draft block to be thrown upward so as to release the coupling.

In order to release the coupling I have provided the following mechanism. A link, as 75, is pivoted, as at 76, to an ear which extends rearwardly from the dog 7. This is connected through the means of a slot 77, with a pin 78 carried by the draft hook. To the rear end of the link 75 is connected a cord, chain, or rod, 79, which is also connected with the release or uncoupling arm 74, which latter is pivoted, as at 73, to an ear 46, forming a part of the draft block.

By throwing this lever 74 downward the first action communicated through the cord 79, is to raise the locking dog 7 out of locking position. When the pin 78 is engaged by the rear end of the slot 77, the draft hook 6 is raised.

To hold this hook raised at will, a second dog 8 is provided, this being pivoted at 80 to the draft hook. The draft block has a transverse bar 49, so positioned that, when the hook is raised, the body of the dog 8 will swing over the same and will thus rest upon the bar 49 and hold the draft hook raised, or in the position shown in Fig. 3. In this position the two parts of the coupling are free to separate.

In coupling, the draft pin 31 engages with a trip lever 81, which is pivoted at 82 upon a part of the draft block. This trip lever has a flange or finger, 83, extending rearwardly and to extend over the cross or connecting bar 49, of the draft block. Its upper end is in position to be engaged by the draft pin 31, so that, as the finger 45 enters the yoke 30, the draft pin will eventually engage the trip lever 81 and force it backward and, in doing so, will force backward the dog 8, thus permitting the draft hook to drop downward. When this occurs the securing dog 7 will drop into place and prevent raising of the draft hook, except through the action of the lever 74.

A spring 84, which connects the lower end of the trip lever 81 with an ear 48 carried by the draft bar, normally holds the upper end of the trip lever swung forwardly. A finger, as 85, carried by this trip lever, engages the cross bar 49 to limit the forward swing of this lever.

In coupling the tractor to the trailer, it is necessary that the outer, upper end of the finger 45, be positioned at a sufficient height so that its tip may slide over the draft pin 31. As the under surface of this finger is inclined, the backward movement of the tractor will force the pin back under the finger 45 and thus raise it and the connected end of the reach 1, so as to relieve the caster wheel 10, or whatever other support may have been used, and leave the trailer in position for forward movement at once. If desired, the caster wheel 10, or whatever is used to support the reach of the trailer, may be additionally raised so as to prevent any possibility of its engaging the ground during transportation.

When engaged and in the position of parts shown in Fig. 5, it is impossible to disengage for the reason that the draft block cannot be raised sufficiently to disengage the tip 60 of the draft hook, because the upper edge of the finger 45 will engage the lower surface of the king pin yoke 3 and also, the upper surface of the reach will engage the lower surface of the draft pin, before the draft hook has been raised enough to clear the draft pin.

By placing the draft pin beneath the frame of the tractor and having the draft connection carried by the reach of the trailer at the upper side thereof, this reach is maintained at a relatively low level and it is, therefore, possible, without making special provisions, to have the freight carrying floor of the trailer at a relatively low level, thus facilitating loading and unloading therefrom.

By placing the king pin rearwardly of the rear axle of the tractor a distance corresponding approximately with the radius of the tractor wheels, it is possible to swing the tractor relative to the trailer, in such manner that their axes are placed approximately at right angles.

The automatic feature in the coupling of the device described, results in saving a considerable amount of time in coupling the tractor to the trailer. The means provided for disconnecting this coupling makes it possible to disconnect the same without any material loss of time and, by carrying the third support upon the reach, which support is represented by the caster wheel 10, the reach may be permitted to drop and will not drop to such a distance as to cause any inconvenience, as it will be caught by the caster wheel 10. This also results in a saving of time and makes it possible to operate a tractor and to drop off these trailers at various points desired.

What I claim as new and desire to protect by Letters Patent is:

1. The combination with a truck, having a king pin having a depending yoke head and a horizontally placed draft pin carried by and connecting the sides of said yoke head, of a trailer having a reach, a guiding nose carried by the reach adapted to enter said yoke and having an inclined under surface adapted to ride upon the draft pin, and a draft hook carried by said nose and adapted to drop over said draft pin.

2. A coupling device between tractor and trailer comprising a draft pin carried by the tractor, a reach upon the trailer, a frame mounted to reciprocate in a fore-and-aft direction upon the reach and having a guiding nose adapted to engage the draft pin upon the tractor, means for securing a draft connection between said frame and the draft pin and a draft spring interposed between the said frame and the reach.

3. A coupling device between a tractor and a trailer, comprising a draft pin carried by the tractor, a reach extending from the trailer, a draft block mounted to have a fore-and-aft movement on the reach, rollers journaled in said block and engaging upper and lower surfaces of the reach, a draft spring interposed between said block and the reach and means for engaging said block with the draft pin.

4. A coupling device between a tractor and a trailer, comprising a draft pin carried by the tractor, a reach extending from the trailer, a draft block mounted to have a fore-and-aft movement on the reach, and having a nose extending forwardly at an upward incline and adapted to ride upon the draft pin in coupling to somewhat raise the reach, rollers journaled in said block and engaging upper and lower surfaces of the reach, a draft spring interposed between said block and the reach and means for engaging said block with the draft pin.

5. A coupling device between a tractor and a trailer comprising a horizontally positioned draft pin carried by one, a draft block carried by the other and mounted to have a fore-and-aft movement, a draft spring acting to limit said movements, a finger projecting from the draft block and having an inclined surface adapted to engage the draft pin in coupling to raise the trailer, a draft hook pivoted on the draft block and adapted to swing over the draft pin, and a locking dog engageable with the draft hook to hold it in draft position.

6. A draft device for trailers comprising a reach, a draft block having wing plates adapted to extend alongside of opposite sides of the reach, rollers journaled in said wing plates and engaging the upper and lower surfaces of the reach and a draft spring interposed between the draft block and the reach.

7. A draft device for trailers comprising a reach having two separated bars, a draft block having wing plates extending alongside of the outer sides of the reach, rollers journaled in said wing plates and engaging the upper and lower faces of the reach, said draft block having an arm extending between the bars composing the reach, a draft spring and a bolt therefor secured to said arm of the draft block and lying between the bars of the reach, stops for said spring carried by the reach, and means for securing said draft bar to the tractor.

Signed at Seattle, Washington, this 19th day of November, 1919.

FRANK T. FALCO.